Figures 1, 2, 3:
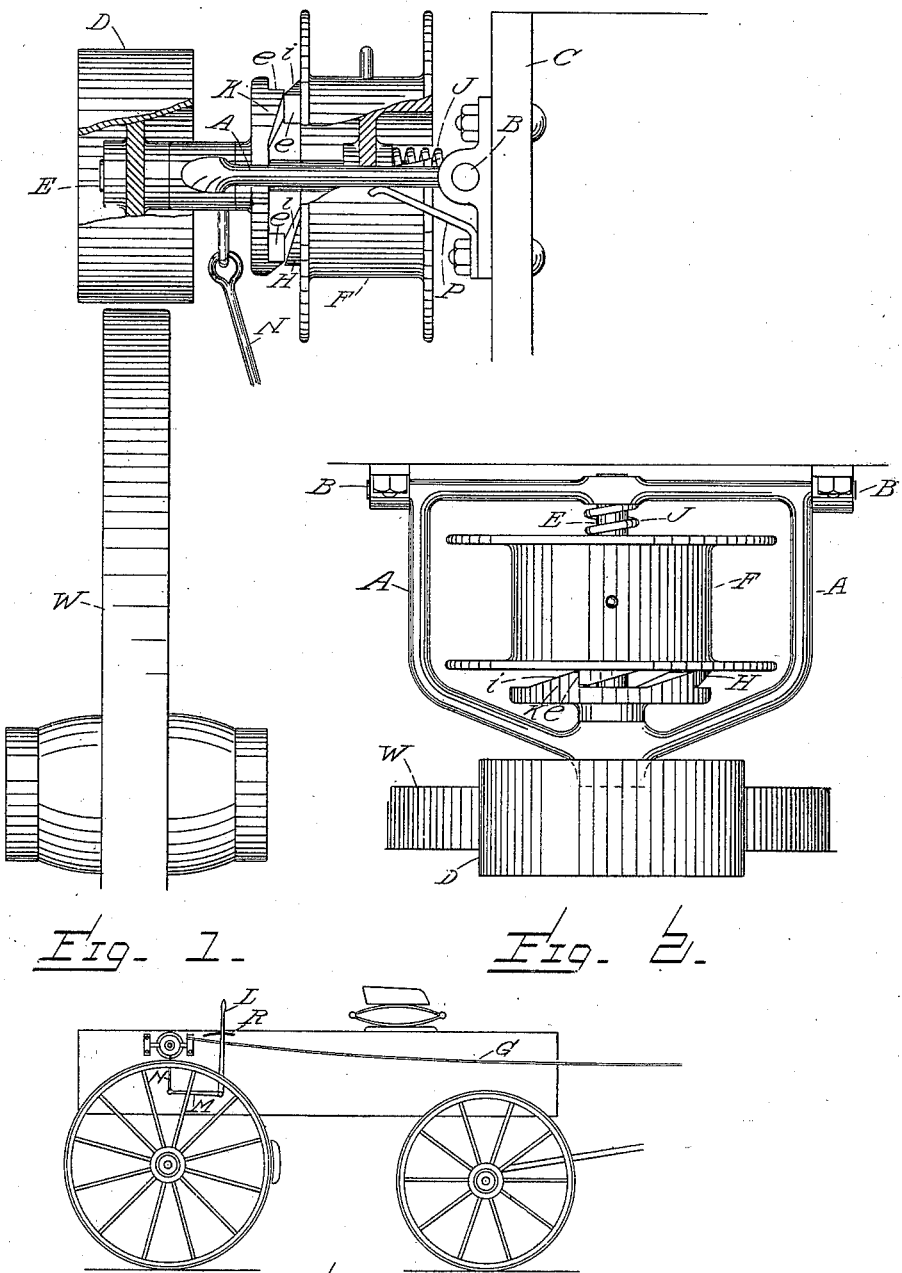

No. 663,881. Patented Dec. 18, 1900.
N. L. GOODWIN.
HORSE HITCHING DEVICE.
(Application filed Jan. 16, 1900.)

(No Model.)

WITNESSES:
Paul Barnes.
Ernest E. Gilmer.

INVENTOR
Norman L. Goodwin
BY Pierre Barnes
his ATTORNEY

UNITED STATES PATENT OFFICE.

NORMAN L. GOODWIN, OF THORP, WASHINGTON.

HORSE-HITCHING DEVICE.

SPECIFICATION forming part of Letters Patent No. 663,881, dated December 18, 1900.

Application filed January 16, 1900. Serial No. 1,703. (No model.)

*To all whom it may concern:*

Be it known that I, NORMAN L. GOODWIN, a citizen of the United States, residing at Thorp, in the county of Kittitas and State of Washington, have invented certain new and useful Improvements in Horse-Hitching Devices, of which the following is a specification, reference being had therein to the accompanying drawings.

My invention relates to mechanism combined with a vehicle-wheel for converting the rotative motion of the wheel to a pull through a line upon the bit of a horse to hitch or check the animal; and it consists in the construction and combination of parts hereinafter described and claimed.

Reference being had to the accompanying drawings, in which similar letters of reference indicate corresponding parts in all the views, Figure 1 is a vertical front view of the rein-winding mechanism, partly in section to show detail of construction. Fig. 2 shows a plan view of the same, and Fig. 3 is a vehicle with my device attached thereto.

The reference-letter A indicates a frame fulcrumed at hinges B, attached to vehicle-body C.

D is a friction-wheel fixedly mounted upon and rotatable with shaft E, journaled in said frame A, said friction-wheel being adapted to engage with the rim or tire of the vehicle-wheel.

F is a spool for winding up the hitching-line G, connected to the bit of the horse, and which spool turns loosely upon the shaft E except when the shaft rotates in one direction, when the half clutch-coupling H, attached thereto, is operatively engaged by spring J with the half clutch-coupling K, secured to shaft E, the teeth of the coupling being formed with corresponding engaging faces *e* and inclined faces *i*, that when the shaft turns in one direction the coupling is complete, but when reversed the inclined faces force the sliding spool and attached half-coupling apart against the action of the spring J, and the shaft is then turned independently of the spool.

L is a hand-lever within convenient reach of the driver, one arm M of which is connected to the frame A by link N to pull the device into operation against the action of spring P.

When it is desired to hitch the horse, the friction-wheel D is brought into contact with the vehicle-wheel W, making the device operative, and in which condition it is retained by locking the lever L on segment R, having notches provided for the purpose, and any forward movement of the horse rotates through wheels W and D the spool F, which winds up the hitching-line G, stopping the animal by the pull exerted upon the bit through said line, which, however, is released when the horse makes a rearward movement by reason of the reversing of the direction of motion of the moving parts and in a more important way, due to the form given to the clutch-teeth, throwing the spool out of engagement, giving instant release.

Having thus described my invention, what I claim as new, and desire to secure by Letters Patent, is—

In a horse-hitching device for vehicles, drawn by animal-power, the combination with a vehicle-wheel, of a frame pivoted to the vehicle-body, a friction-wheel carried by said frame and adapted to engage the tire of the vehicle-wheel, a hand-lever connected to the frame to move same so as to bring the friction-wheel into engagement with the vehicle-wheel tire, and a spring for moving said frame to release such engagement, a drum and a rein connected thereto for checking the animal, said drum and friction-wheel being provided with clutching means adapted to couple the drum and friction in only one direction of movement and said clutching means comprising inclined teeth adapted to disengage the said parts, and a spring adapted to cause engagement of the clutching means, substantially as set forth.

In testimony whereof I affix my signature in presence of two witnesses.

NORMAN L. GOODWIN.

Witnesses:
PIERRE BARNES,
ERNEST E. GILMER.